（12）United States Patent
Kim

(10) Patent No.: US 10,451,141 B2
(45) Date of Patent: Oct. 22, 2019

(54) FLUID MOUNT HAVING CONTINUOUSLY VARIABLE CHARACTERISTICS FOR IMPROVING DRIVING PERFORMANCE

(71) Applicants: Hyundai Motor Company, Seoul (KR); Kia Motors Corporation, Seoul (KR)

(72) Inventor: Seung-Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/829,550

(22) Filed: Dec. 1, 2017

(65) Prior Publication Data

US 2019/0072152 A1 Mar. 7, 2019

(30) Foreign Application Priority Data

Sep. 1, 2017 (KR) .................. 10-2017-0111999

(51) Int. Cl.
*F16F 13/26* (2006.01)
*B60K 5/12* (2006.01)
*F16F 13/10* (2006.01)

(52) U.S. Cl.
CPC .......... *F16F 13/262* (2013.01); *B60K 5/1208* (2013.01); *B60K 5/1283* (2013.01); *F16F 13/107* (2013.01); *F16F 13/108* (2013.01)

(58) Field of Classification Search
CPC ...... F16F 13/262; F16F 13/107; F16F 13/108; B60K 5/1208; B60K 5/1283
See application file for complete search history.

(56) References Cited

U.S. PATENT DOCUMENTS

| 4,836,515 | A  | * | 6/1989  | Franz  | F16F 13/262 |
|           |    |   |         |        | 248/566     |
| 9,987,915 | B1 | * | 6/2018  | Yoon   | B60K 5/1208 |
| 2008/0174058 | A1 | * | 7/2008 | Saiki | F16F 13/266 |
|           |    |   |         |        | 267/140.14  |
| 2008/0296818 | A1 | * | 12/2008 | Koyama | F16F 13/26 |
|           |    |   |         |        | 267/140.14  |
| 2017/0313171 | A1 | * | 11/2017 | Yoon  | B60K 5/1208 |

FOREIGN PATENT DOCUMENTS

| KR | 10-1288995 B1   | 7/2013  |
| KR | 2014-0044485 A  | 4/2014  |
| KR | 2014-0142930 A  | 12/2014 |
| KR | 10-1585429 B1   | 1/2016  |

* cited by examiner

*Primary Examiner* — Vishal R Sahni

(74) *Attorney, Agent, or Firm* — Mintz Levin Cohn Ferris Glovsky and Popeo, P.C.; Peter F. Corless

(57) ABSTRACT

A fluid mount is provided having continuously variable characteristics for improving driving performance in which an automatic fluid opening and closing unit is installed between upper and lower fluid chambers. The fluid mount includes a core having a central bolt, engaged with an engine, inserted into a central portion of the core, and a rubber member formed on an outer circumferential surface of the core. The core and the rubber member are disposed in a bracket housing. The upper and lower fluid chambers and the automatic fluid opening and closing unit are installed between the upper and lower fluid chambers to continuously open and close a flow path through current change.

6 Claims, 5 Drawing Sheets

FIG. 2
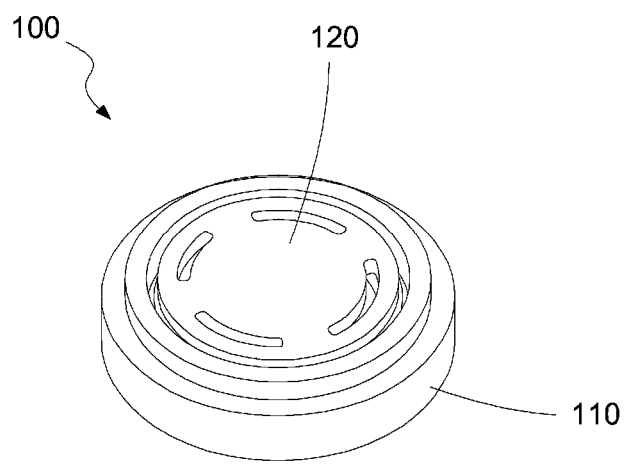
FIG. 3A
FIG. 3B
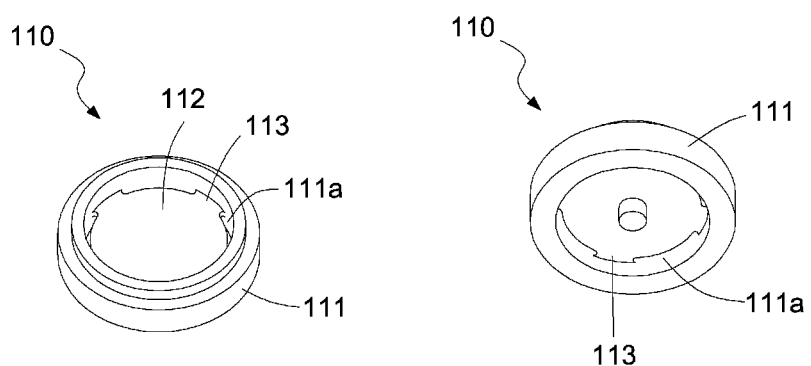

FLUID MOUNT HAVING CONTINUOUSLY VARIABLE CHARACTERISTICS FOR IMPROVING DRIVING PERFORMANCE

CROSS-REFERENCE TO RELATED APPLICATION

This application claims the priority benefit of Korean Patent Application No. 10-2017-0111999, filed on Sep. 1, 2017, the disclosure of which is incorporated herein by reference.

BACKGROUND

1. Field of the Invention

The present invention relates to a fluid mount having continuously variable characteristics for improving driving performance, and more particularly, to a fluid mount having continuously variable characteristics for improving driving performance in which an automatic fluid opening and closing unit is installed between an upper fluid chamber and a lower fluid chamber.

2. Description of the Related Art

Recently, to vary characteristics of vehicles according to driving conditions, various types of engine mounts, such as a semi-active mount, an active mount, etc., have been developed. Thereamong, a magnetorheological fluid (MRF) mount has developed with a structure in which an MR fluid is applied to the inside of a similar structure to a general hydraulic mount and shearing stress of the fluid is varied according to the intensity of a magnetic field applied to the fluid. Accordingly, mount characteristics may be varied and, thus, noise, vibration and harshness (NVH) and SS performances may be improved.

Compared to a general semi-active mount, the above MRF mount is advantageous in that characteristics of the MRF mount may be continuously varied in proportion to the intensity of current input to the MRF mount. Since a semi-active mount is configured such that characteristics thereof are implemented through a step method and an active mount is not a system proper for raising dynamic characteristics thereof, these mounts have difficulty improving SS performance.

Further, the MRF mount may be continuously conscious of dynamic characteristics to adjust such dynamic characteristics and, thus, change in vibration (impact) in a vehicle is not detected. However, a large drawback of the MRF mount is high cost since the MRF mount is more expensive than a general active mount. Therefore, the present invention proposes a fluid mount which has continuously variable characteristics according to driving conditions and is of a cost that is comparable to a semi-active mount.

SUMMARY

Therefore, the present invention provides a fluid mount having continuously variable characteristics for improving driving performance in which an automatic fluid opening and closing unit is installed between an upper fluid chamber and a lower fluid chamber so s to maintain advantages of a conventional MRF mount, such as continuous mount characteristic change and variability toward rise in dynamic characteristics and to have the same characteristics as the conventional MRF mount.

Technical objects to be achieved by the present invention are not limited to those mentioned above, and other objects may be clearly understood by those skilled in the art from the description given below.

In accordance with an aspect of the present invention, a fluid mount having continuously variable characteristics for improving driving performance may include a core having a central bolt, engaged with an engine and inserted into a central portion of the core, and a rubber member formed on an outer circumferential surface of the core, the core and the rubber member being disposed in a bracket housing, an upper fluid chamber that contacts the core and the rubber member to seal a fluid therein, a lower fluid chamber disposed under the upper fluid chamber to seal the fluid therein, and an automatic fluid opening and closing unit installed between the upper fluid chamber and the lower fluid chamber to continuously open and close a flow path through current change.

The automatic fluid opening and closing unit may include a yoke that has a main body with an open upper surface and a receipt space formed therein, and a coil fixing plate disposed in the lower region of the receipt space and having a coil wound thereon, and a plunger installed within the receipt space (e.g., cavity) of the yoke, having a plurality of fluid apertures and configured to move vertically within the receipt space by magnetic force of the coil.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a perspective view illustrating the automatic fluid opening and closing unit in accordance with an exemplary embodiment of the present invention;

FIG. 3A is a perspective top view of the yoke of the automatic fluid opening and closing unit in accordance with an exemplary embodiment of the present invention;

FIG. 3B is a perspective bottom view of the yoke of the automatic fluid opening and closing unit in accordance with an exemplary embodiment of the present invention;

DETAILED DESCRIPTION

Figure 1:
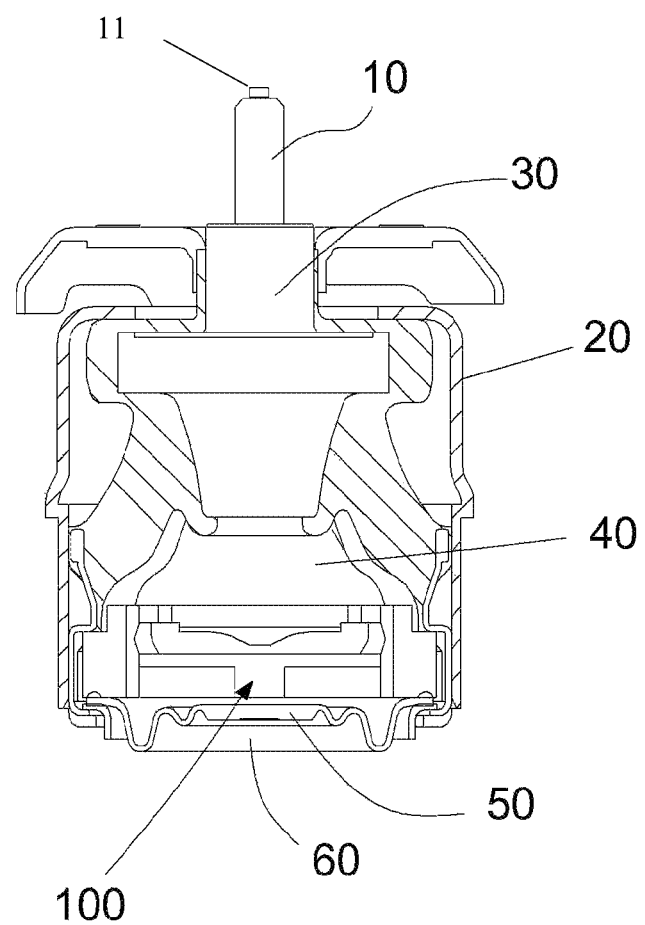
FIG. 1 is a cross-sectional view of a fluid mount having continuously variable characteristics for improving driving performance in accordance with an exemplary embodiment of the present invention, illustrating a state in which an automatic fluid opening and closing unit is installed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, it is to be understood that the detailed description, which will be disclosed along with the accompanying drawings, is intended to describe exemplary embodiments of the present invention and is not intended to represent all technical ideas of the present invention. In order to clearly describe the present invention, parts which are not related to the description will be omitted, and the same or similar elements throughout the specification are denoted by the same reference numerals even though they are depicted in different drawings.

In addition, the terms or words used in the specification and claims of the present invention are not to be interpreted as having typical or dictionary meanings, and are to be interpreted as having meanings and concepts conforming to the technical sprit of the present invention based on the principle that the inventors may appropriately define the concepts of the terms to explain the present invention in the best manner.

Exemplary embodiments of the present invention will be described in detail with reference to the accompanying drawings. As exemplarily shown in FIG. 1, a fluid mount having continuously variable characteristics for improving driving performance in accordance with the present invention may include a core 10 having a central bolt 11 engaged with an engine and inserted into a central portion of the core 10, and a rubber member 30 formed on an outer circumferential surface of the core 10, the core 10 and the rubber member 30 being disposed in a bracket housing 20, an upper fluid chamber 40 that contacts the core 10 and the rubber member 30 to seal a fluid therein, a lower fluid chamber 50 disposed under the upper fluid chamber 40 to seal the fluid therein, and a diaphragm 60, in the same manner as the structure of a conventional fluid mount.

However, the fluid mount in accordance with the present invention may further include an automatic fluid opening and closing unit 100 installed between the upper fluid chamber 40 and the lower fluid chamber 50 to continuously open and close a flow path 101 through current change and, thus, maintains advantages of a conventional MRF mount, such as continuous mount characteristic change and variability toward rise in dynamic characteristics and has the same characteristics as the conventional MRF mount.

The automatic fluid opening and closing unit 100 may include a yoke 110 and a plunger 120, as shown in FIG. 2. The yoke 110, as shown in FIGS. 3A and 3B, may include a cylindrical main body 111 formed of a metal and having an open upper surface and a receipt space 111a (e.g., a cavity) formed therein, and a coil fixing plate 112 disposed in the lower region of the receipt space 111a and having a coil 112a wound thereon.

Figure 4A:
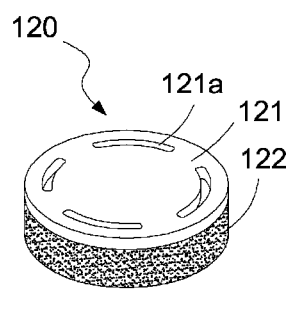
FIG. 4A is a perspective top view of the plunger of the automatic fluid opening and closing unit in accordance with an exemplary embodiment of the present invention.
Figure 4B:
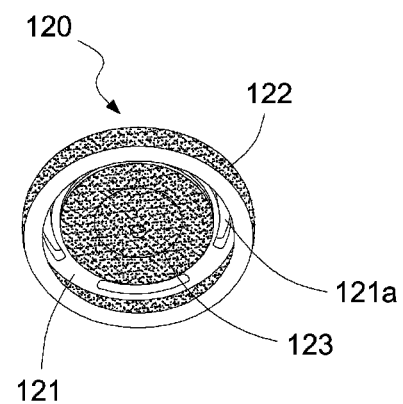
FIG. 4B is a perspective bottom view of the plunger of the automatic fluid opening and closing unit in accordance with an exemplary embodiment of the present invention.
Figure 5A:
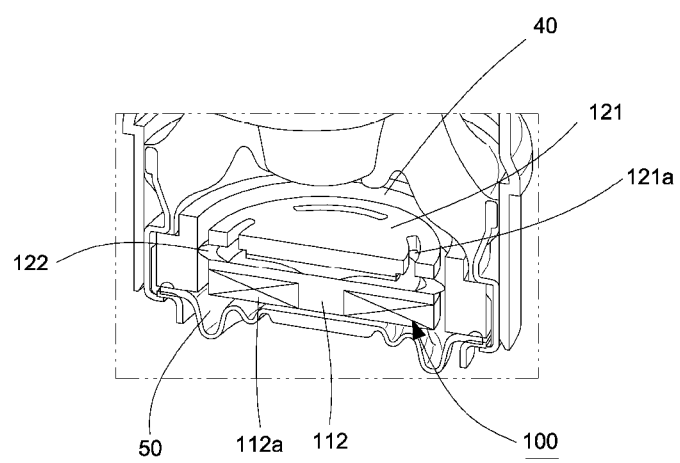
FIGS. 5A and 5B are detailed cross-sectional views illustrating the fluid mount in accordance with an exemplary embodiment the present invention in the state in which the automatic fluid opening and closing unit is installed.
Figure 5B:
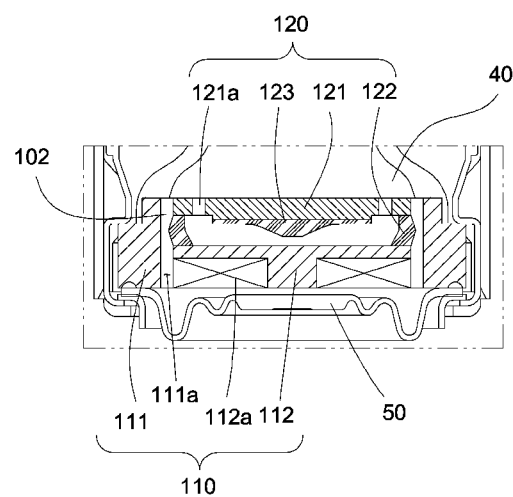

The main body 111 and the coil fixing plate 112 may be formed integrally using a plurality of connection ribs 113, and a fluid channel 102 may be formed between the connection ribs 113. The coil fixing plate 112 may be formed as an approximate T-shape, and the coil 112a may be wound on a column vertically formed at the center of the coil fixing plate 112. The plunger 120, as exemplarily shown in FIG. 1 or FIGS. 5A and 5B, may include a disc-shaped upper plate 121 installed within the receipt space 111a of the yoke 111, i.e., spaced apart from the coil fixing plate 112 by a designated interval, and may include a plurality of fluid apertures 121a, a cylindrical rubber bridge 112 formed at the lower part of the plunger 120 through vulcanization, and a stopper 123 (with reference to FIGS. 4A and 4B).

The fluid apertures 121a allow the fluid within the upper and lower fluid chambers 40 and 50 to flow to prevent subjection to secondary load, when the upper plate 121 moves vertically. For example, the fluid apertures 121a may be formed to allow the fluid located in a space between the upper plate 121 and the coil fixing plate 112 to flow freely without resistance, when the rubber bridge 122 is restored to an original position by rubber elasticity when the upper plate 121 is pulled by a magnetic field. The fluid apertures 121a may operate as a conventional orifice and influence high frequency characteristics.

The stopper 123, which may also be formed of rubber and in a conical shape, may be installed to prevent connection between the plunger 120 and the yoke 110 when the plunger 120 moves vertically within the receipt space 111a by magnetic force of the yoke 110. Further, the plunger 120 installed within the receipt space 111a of the yoke 110 may have a diameter less than that of the receipt space 111a and, thus, the flow path 101 may be formed between the receipt space 111a and the plunger 120 and used as a fluid channel that communicates with the upper fluid chamber 40 and the lower fluid chamber 50.

The flow path 101 may operate as an orifice to vary overall characteristics of the mount when the plunger 120 moves to the upper fluid chamber 40 and the lower fluid chamber 50. The plunger 120 may be formed by assembling the coil fixing plate 112, on which the coil 112a is wound, with the main body 11 of the yoke 110 and forming the cylindrical rubber bridge 122 and the stopper 123 at the lower part of the upper plate 121 of the plunger 120 through vulcanization. After the above the plunger 120 is coupled with the yoke 110, the yoke 110 provided with the plunger 120 may be installed within the rubber member 30, i.e., within the upper and lower fluid chambers 40 and 50, curling of the case 100 may be performed, and the case 100 may be fitted into the bracket housing 20 by pressing, thus completing manufacture of the fluid mount.

Therefore, in the above-described fluid mount having continuously variable characteristics for improving driving performance in accordance with the present invention, when current is applied to the coil 121*a* installed in the yoke 110, the coil fixing plate 112 generates magnetic force by such current.

Figure 6A:
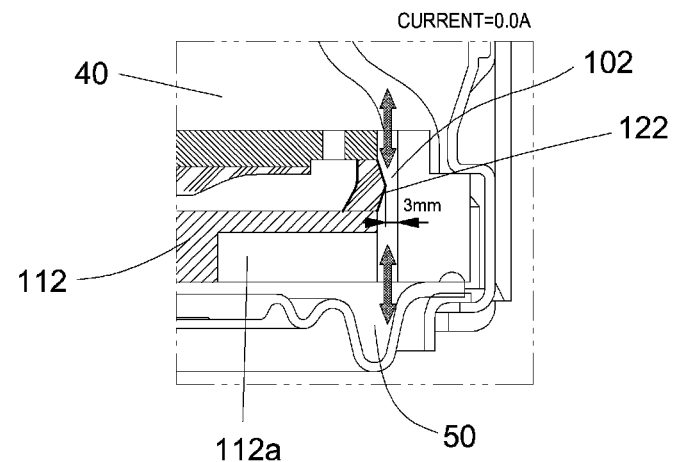
FIG. 6A is a cross-sectional view of the automatic fluid opening and closing unit in an idling state in accordance with an exemplary embodiment of the present invention.
Figure 6B:
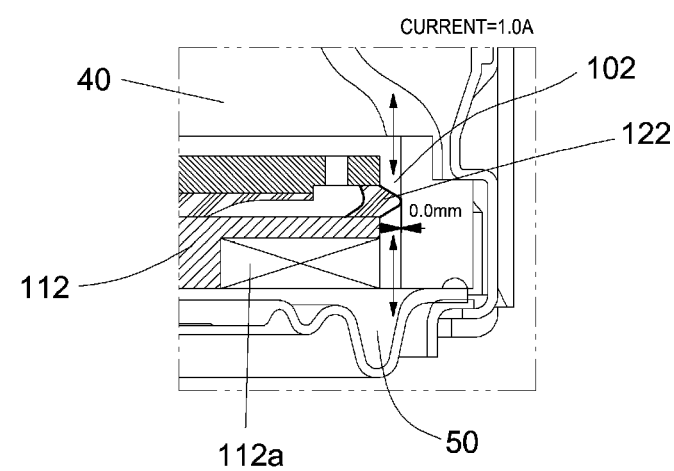
FIG. 6B is a cross-sectional view of the automatic fluid opening and closing unit in a state in which a flow path is closed by a rubber bridge during driving in accordance with an exemplary embodiment of the present invention.

Then, as exemplarily shown in FIG. 6B, the upper plate 121 may be lowered to the coil fixing plate 112 by the magnetic force. In particular, the rubber bridge 122, which is formed at the upper plate 121 through vulcanization, in a contact state with the coil fixing plate 122 may be bent outwards by lowering force of the upper plate 121 to thus close the flow path 101. By continuously opening and closing the flow path 101 in such a manner, the fluid mount in accordance with the present invention is capable of maintaining advantages of a conventional MRF mount, such as continuous mount characteristic change and variability toward rise in dynamic characteristics, and has the same characteristics as the conventional MRF mount.

Further, a width of the flow path 101 may be varied according to an intensity of current. This will be described with reference to FIGS. 6A and 6B. As exemplarily shown in FIG. 6A, at current of 0.0 A during idling of a vehicle engine, the flow path 101 that communicates with the upper and lower fluid chambers 40 and 50 maintains a width of about 3 mm, and the fluid flows freely to the upper and lower fluid chambers 40 and 50.

In other words, the fluid passes through the upper and lower fluid chambers 40 and 50 through the flow path 101 and a part of the fluid is confined within the lower fluid chamber 50, thus lowering dynamic characteristics. Therefore, an insulation factor may be increased and idling vibration may be reduced. Further, as exemplarily shown in FIG. 6B, when current of about 1 A flows during driving of the vehicle, the rubber bridge 122 may be bent outwards by decreases force and closes the flow path 101, thus blocking a flow of the fluid.

When a flow of the fluid is blocked, the fluid may be confined within the upper fluid chamber 40, thus raising dynamic characteristics. Further, the fluid mount in accordance with the present invention does not use an MR fluid used in a conventional MRF mount and uses a general fluid, thus substantially reducing production costs. For example, the price of the MR fluid is 1,200,000 Won per kg but the price of the fluid used in the fluid mount in accordance with the present invention is about 10,000 Won per kg, and thus production costs may be substantially reduced.

As is apparent from the above description, a fluid mount having continuously variable characteristics for improving driving performance in accordance with the present invention may have effects, as below.

First, the fluid mount in accordance with the present invention includes an automatic fluid opening and closing unit in addition to the structure of a general fluid mount and may thus continuously vary characteristics in the same manner a conventional MRF mount.

Second, in an MR fluid used in the conventional MRF mount, as time goes by, iron shavings in the MR fluid sink down and thus the conventional MRF mount malfunctions. However, the fluid mount in accordance with the present invention uses a general fluid (e.g., a mount solution which is equal to an anti-freezing solution) and is normally operated so that variation of characteristics is executed normally over time, thus securing robustness in performance.

Third, the MR fluid used in the conventional MRF mount reacts with rubber and thus durability is deteriorated. However, the fluid mount in accordance with the present invention uses the general fluid (the mount solution) and thus has the same durability as a general hydraulic mount, thereby securing robust durability.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fluid mount having continuously variable characteristics for improving driving performance, including:
   a core having a central bolt engaged with an engine and inserted into a central portion of the core, and a rubber member formed on an outer circumferential surface of the core, the core and the rubber member being disposed in a bracket housing;
   an upper fluid chamber that contacts the core and the rubber member to seal a fluid therein;
   a lower fluid chamber disposed under the upper fluid chamber to seal the fluid therein; and
   an automatic fluid opening and closing unit installed between the upper fluid chamber and the lower fluid chamber to continuously open and close a flow path through current change,
   wherein the automatic fluid opening and closing unit includes:
   a yoke including a main body having an open upper surface and a receipt space formed therein, and a coil fixing plate disposed in a lower region of the receipt space and having a coil wound thereon; and
   a plunger installed within the receipt space of the yoke, having a plurality of fluid apertures and moving vertically within the receipt space by magnetic force of the coil,
   wherein the plunger includes a disc-shaped upper plate installed within the receipt space of the yoke, and spaced apart from the coil fixing plate by a predetermined interval, and
   wherein the plunger installed within the receipt space of the yoke has a diameter less than a diameter of the receipt space, forming the flow path radially exterior to the upper plate of the plunger and the coil fixing plate as a fluid channel in communication with the upper fluid chamber and the lower fluid chamber.

2. The fluid mount having continuously variable characteristics for improving driving performance according to claim 1, wherein the plunger includes:
   the upper plate having the fluid apertures formed therethrough; and
   a cylindrical rubber bridge installed at the lower part of the plunger.

3. The fluid mount having continuously variable characteristics for improving driving performance according to claim 2, wherein a stopper to prevent connection between the plunger and the yoke when the plunger vertically moves is formed on a lower surface of the upper plate having the fluid apertures.

4. The fluid mount having continuously variable characteristics for improving driving performance according to claim 1, wherein the plunger moves toward the coil fixing plate by magnetic force of the coil installed in the yoke.

5. The fluid mount having continuously variable characteristics for improving driving performance according to claim 2, wherein the rubber bridge is bent outwards and closes the flow path when the plunger is lowered.

6. The fluid mount having continuously variable characteristics for improving driving performance according to claim 1, wherein a width of the flow path is varied according to an intensity of current.

\* \* \* \* \*